(12) United States Patent
Brinker et al.

(10) Patent No.: US 11,464,153 B2
(45) Date of Patent: Oct. 11, 2022

(54) TILLAGE IMPLEMENT WITH GAUGE WHEELS HAVING HYDRAULIC DOWN-PRESSURE

(71) Applicant: AGCO Corporation, Duluth, GA (US)

(72) Inventors: Jarret Lee Brinker, Beloit, KS (US); Jeffrey Scott Hughes, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 337 days.

(21) Appl. No.: 16/772,087

(22) PCT Filed: Nov. 5, 2018

(86) PCT No.: PCT/IB2018/058657
§ 371 (c)(1),
(2) Date: Jun. 11, 2020

(87) PCT Pub. No.: WO2019/123040
PCT Pub. Date: Jun. 27, 2019

(65) Prior Publication Data
US 2021/0068330 A1 Mar. 11, 2021

Related U.S. Application Data

(60) Provisional application No. 62/608,723, filed on Dec. 21, 2017.

(51) Int. Cl.
*A01B 63/22* (2006.01)
*A01B 73/04* (2006.01)
(Continued)

(52) U.S. Cl.
CPC ............ *A01B 63/22* (2013.01); *A01B 73/044* (2013.01); *F15B 13/025* (2013.01); *F15B 19/00* (2013.01); *A01B 5/04* (2013.01); *F15B 2211/50* (2013.01)

(58) Field of Classification Search
CPC ......... A01B 63/22; A01B 73/044; A01B 5/04; F15B 13/025; F15B 19/00; F15B 2211/50
See application file for complete search history.

(56) References Cited

U.S. PATENT DOCUMENTS

| 6,253,692 B1 | 7/2001 | Wendling et al. |
| 2012/0048159 A1 | 3/2012 | Adams et al. |

(Continued)

FOREIGN PATENT DOCUMENTS

| CA | 2 252 293 A1 | 4/2000 |
| EP | 3 398 419 A1 | 11/2018 |

OTHER PUBLICATIONS

European Patent Office, International Search Report for related International Application No. PCT/IB2018/058657, dated Mar. 19, 2019.

(Continued)

*Primary Examiner* — Tara Mayo-Pinnock

(57) ABSTRACT

A tillage implement has a frame with a center section and first and second outer wing sections hingedly attached to respective outer ends of the center section. Controlling a pressure in a secondary side of a hydraulic circuit enables adjustment of the downward pressure precharge provided by hydraulic cylinders based on a desired stiffness of the implement. Flow from a hydraulic supply through a pressure-reducing valve puts the downward pressure precharge on gauge wheels. Once this desired downward pressure precharge has been achieved, flow from the hydraulic supply is shut off and a check valve holds the pressure such that the hydraulic cylinders hold the gauge wheels in the desired position.

20 Claims, 3 Drawing Sheets

(51) Int. Cl.
*F15B 13/02* (2006.01)
*F15B 19/00* (2006.01)
*A01B 5/04* (2006.01)

(56) References Cited

U.S. PATENT DOCUMENTS

| | | |
|---|---|---|
| 2015/0129255 A1 | 5/2015 | Sudbrink et al. |
| 2016/0316611 A1 | 11/2016 | Fink et al. |
| 2017/0112046 A1 | 4/2017 | Sudbrink et al. |

OTHER PUBLICATIONS

UK Intellectual Property Office, Search Report for UK Priority Application No. 1800458.0, dated Jul. 10, 2018.

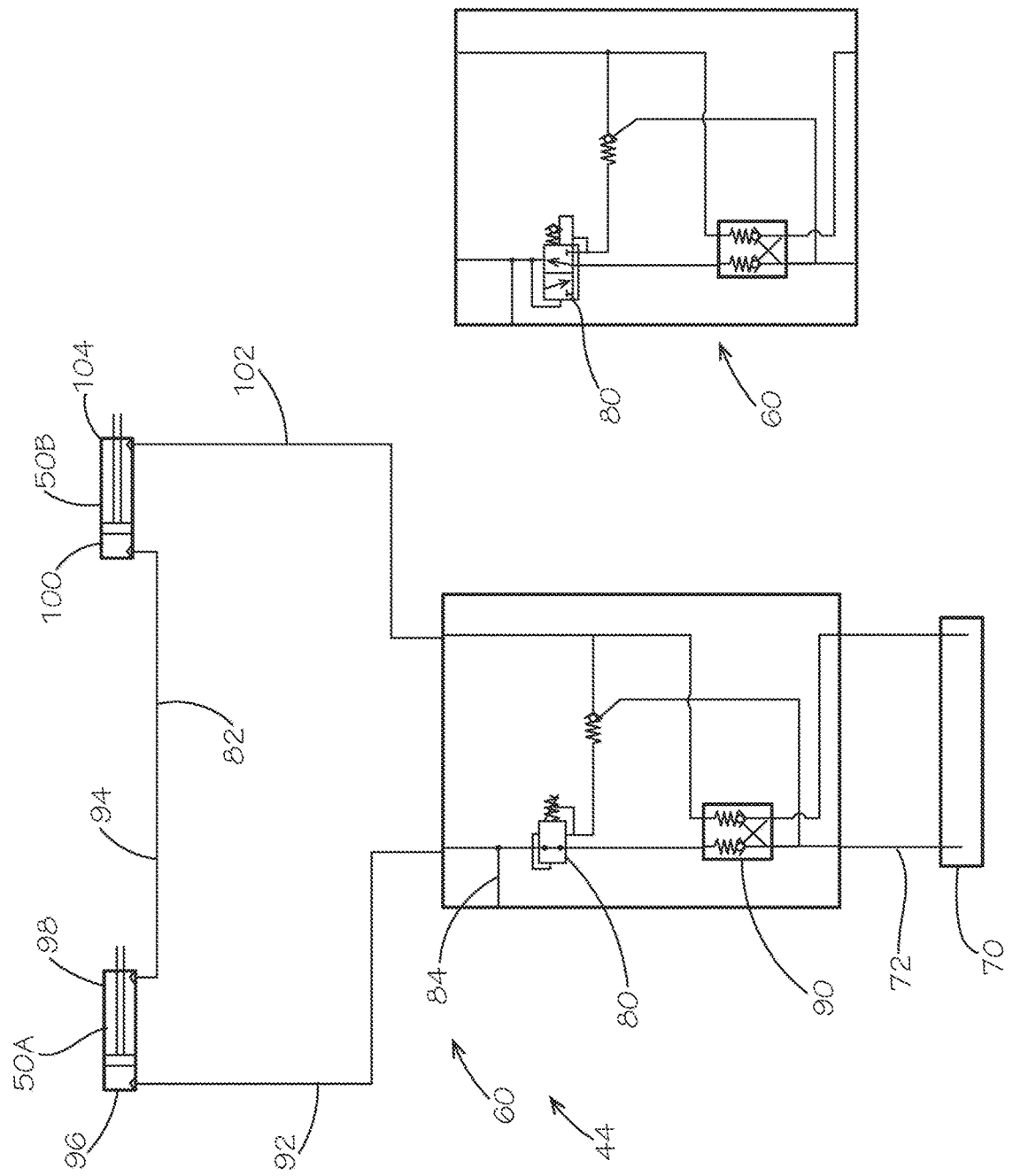

TILLAGE IMPLEMENT WITH GAUGE WHEELS HAVING HYDRAULIC DOWN-PRESSURE

CROSS-REFERENCE TO RELATED APPLICATIONS

This application is a national phase entry under 35 U.S.C. § 371 of International Patent Application PCT/IB2018/058657, filed Nov. 5, 2018, designating the United States of America and published in English as International Patent Publication WO 2019/123040 A1 on Jun. 27, 2019, which claimed the benefit of the filing date of U.S. Provisional Patent Application 62/608,723, "Tillage Implement with Gauge Wheels Having Hydraulic Down-Pressure," filed Dec. 21, 2017, the entire disclosure of each of which is incorporated herein by reference.

FIELD

This disclosure relates generally to agricultural implements and, more particularly to multi-section tillage implements having gauge wheels to support outer sections of the implement.

BACKGROUND

Many agricultural tillage implements utilize a depth-control system for positioning the height of the implement relative to the soil. The depth-control system typically uses the main lift wheels to set the depth of the ground-engaging tools. Depending on the soil conditions expected to be encountered by the implement, the depth-control system is adjusted to preselect a desired tillage depth. Hydraulic cylinders mounted to the implement are typically used to adjust the depth. Gauge wheels are used to support the implement frame These tillage implements require an operator to get out of the tractor to adjust the gauge-wheel depth any time a tool depth adjustment is made. It is suggested to put the implement down into working position and then manually adjust the linkage to put a little pressure on the gauge wheel. This is time consuming and makes depth/gauge-wheel change not very convenient. Being able to automate this process will speed up the process and help farmers make the adjustments they should be making as well as make the setting more consistent.

BRIEF SUMMARY

In one embodiment, a tillage implement has a frame with a center section and first and second outer wing sections hingedly attached to respective outer ends of the center section such that the first and second wing sections can be operably raised and lowered between a field-working position and a transport position. The center section and the first and second outer wing sections carry tillage tools for working the soil as the tillage implement is advanced across a field. The tillage implement includes a first vertically-adjustable stabilizer-wheel assembly connected to an outer front portion of the first outer wing sections, the stabilizer-wheel assembly including a first gauge wheel. The tillage implement includes a second vertically-adjustable stabilizer-wheel assembly connected to an outer front portion of the second outer wing section, the second stabilizer-wheel assembly including a second gauge wheel. The tillage implement includes a gauge-wheel pressure system configured to act upon the first and second stabilizer-wheel assemblies, wherein the gauge-wheel pressure system includes a first hydraulic cylinder connected to the first gauge wheel and second hydraulic cylinder connected to the second gauge wheel, each gauge-wheel hydraulic cylinder connecting with its respective gauge wheel through a linkage such that each cylinder provides a downward pressure precharge on its gauge wheel. The tillage implement includes a hydraulic circuit associated with the gauge-wheel pressure system, the hydraulic circuit including a hydraulic supply in a primary side of the hydraulic circuit, wherein the gauge-wheel pressure system includes a pressure-reducing valve configured to regulate a pressure in a secondary side of the hydraulic circuit. The tillage implement includes a blocking valve configured to isolate the pressure-reducing valve and hydraulic circuit from the hydraulic supply. The tillage implement includes a pressure gauge configured to read the pressure in the secondary side of the circuit and is used so that an operator may use the pressure-reducing valve to manually set the pressure in the secondary side.

Controlling the precharge in the secondary side of the hydraulic circuit enables the operator of the implement to adjust the downward pressure precharge provided by the first and second hydraulic cylinders based on a desired stiffness of the implement, and with the use of the pressure-reducing valve to command flow from the hydraulic supply through the pressure-reducing valve and put downward pressure precharge on the gauge wheels. Once this desired downward pressure precharge has been achieved, flow from the hydraulic supply is shut off and the blocking valve holds the pressure such that the first and second cylinders hold their respective gauge wheels in the desired position.

In another aspect, the tillage implement has frame-supporting wheels, the frame-supporting wheels being mounted to wheel mounting spars which are rigidly attached to a rock shaft with the rock shaft mounted to the frame for rotational movement relative to the frame controlled by a depth-control system. The depth-control system includes an actuation mechanism used to rotate the rock shaft and move the frame relative the frame-supporting wheels upwardly or downwardly to raise or lower the working depth of the tools. The pressure-reducing valve is used to command flow from the hydraulic supply through the pressure-reducing valve once the implement is at its working depth as set by the depth-control system and put downward pressure precharge on the gauge wheels, and once this desired down-pressure has been achieved, flow from the hydraulic supply is shut off and the blocking valve holds the pressure such that the first and second cylinders hold their respective gauge wheels in the desired position.

These and other features and advantages of this disclosure are described in, or are apparent from, the following detailed description of various exemplary embodiments.

BRIEF DESCRIPTION OF THE DRAWINGS

The above mentioned and other features will become more apparent and will be better understood by reference to the following description of embodiments in conjunction with the accompanying drawings, wherein:

FIG. 3 is a schematic view of a hydraulic circuit of the tillage implement with a pressure-reducing valve; and FIG. 4 is a schematic view of the hydraulic circuit of the tillage implement having an alternate pressure-reducing valve.

Corresponding reference characters indicate corresponding parts throughout the views of the drawings.

DETAILED DESCRIPTION

Embodiments will now be described in the following detailed description with reference to the drawings, wherein certain embodiments are described in detail to enable practice thereof. Although described with reference to these specific preferred embodiments, it will be understood that the disclosure is not limited to these preferred embodiments. But to the contrary, numerous alternatives, modifications, and equivalents as will become apparent from consideration of the following detailed description.

Figure 1:
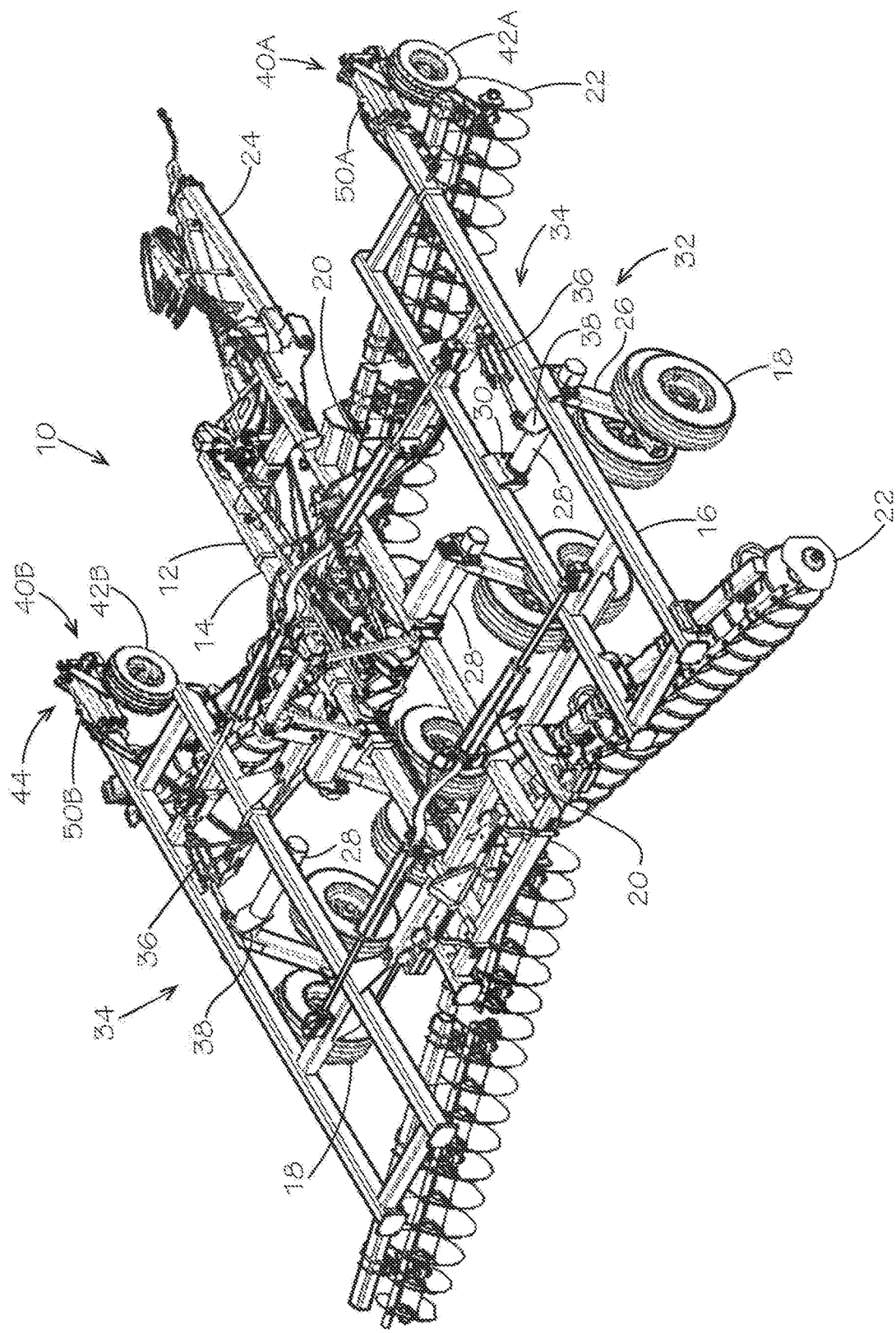
FIG. 1 is a perspective view of a tillage implement.

The tillage implement 10 illustrated in FIG. 1 has been selected as but one of many different possible examples of machines with which the present disclosure may be utilized. In the illustrated embodiment, implement 10 is a three-section folding machine having a frame 12 with a center section 14 and two outer wing sections 16 hingedly attached to respective outer ends of the center section 14. The frame 12 is supported above the ground by frame-supporting wheels 18. As well known in the art, the wing sections 16 can "flex" about respective fore-and-aft axes at hinge points so as to accommodate changes in ground contour experienced locally by the sections 14, 16 of the implement 10. In addition, hydraulic wing lift cylinders 20 are used for raising and lowering the wing sections 16 between a field-working position (shown) and a field transport position. Each of the sections 14, 16 carries tillage tools 22 such as gangs of discs for working the soil as the machine is advanced across a field. A tongue 24 projects forwardly from the center section 14 for hitching the machine to a towing vehicle (not shown).

The frame-supporting wheels 18 are mounted to wheel-mounting spars 26, which are rigidly attached to a rock shaft 28. The rock shaft 28 is mounted to the frame 12 by suitable bearings 30, which support the rock shaft 28 for rotational movement relative to the frame 12, controlled by a depth-control system 32. The depth-control system 32 includes an actuation mechanism 34 used to rotate the rock shaft 28. In the illustrated embodiment, the actuation mechanism 34 includes a hydraulic cylinder 36 extending between the frame 12 and an upwardly extending weldment 38. Thus, actuation of the cylinder 36 actuates the rock shaft 28 to pivot within the bearings 30 to move the frame 12 relative the frame-supporting wheels 18 upwardly or downwardly to raise or lower the working depth of the tools 22. The depth-control system 32 uses suitable hydraulic valves for controlling fluid flow to the cylinder 36 as would be known in the art.

Figure 2:
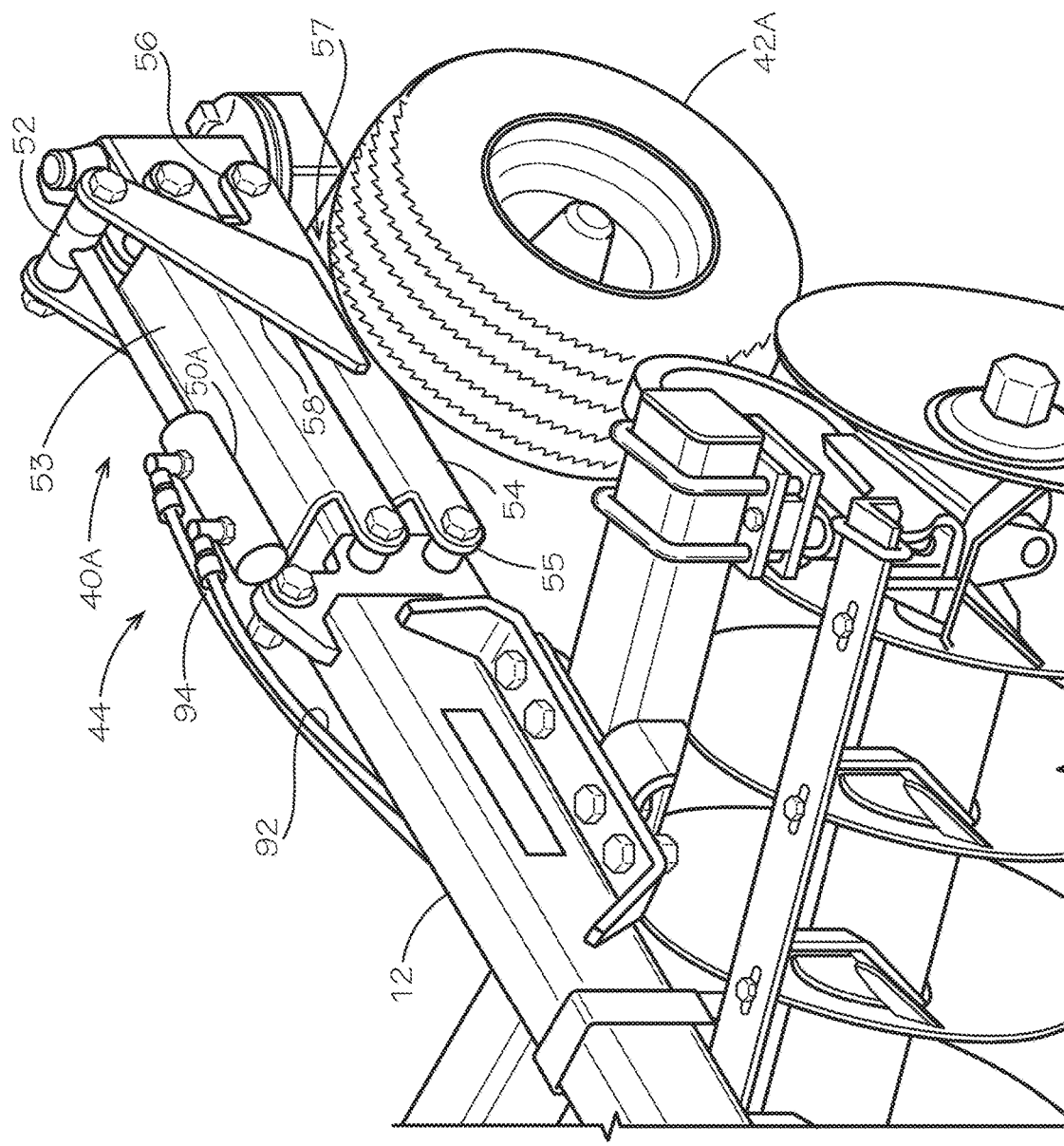
FIG. 2 is an enlarged perspective view of a portion of the tillage implement of FIG. 1.

Turning also now to FIG. 2, vertically adjustable stabilizer-wheel assemblies 40A and 40B are connected to the outer front portions of the outer wing sections 16 forwardly of the front tillage tools 22. The stabilizer-wheel assemblies 40A and 40B include gauge wheels 42A and 42B, respectively, which in the illustrated embodiment are limited-rotation caster wheels. As the implement 10 operates in the field, the implement 10 may encounter uneven terrain, and the stabilizer-wheel assemblies 40A and 40B support the frame 12.

As shown in FIGS. 1 and 2, the implement 10 has a gauge-wheel pressure system 44 configured to act upon the stabilizer-wheel assemblies 40A and 40B. The gauge-wheel pressure system 44 includes a hydraulic cylinder 50A connected to gauge wheel 42A and hydraulic cylinder 50B connected to gauge wheel 42B. While the illustrated embodiment shows two hydraulic cylinders 50A and 50B, one skilled in the art will understand that the gauge-wheel pressure system 44 may utilize additional hydraulic cylinders. As perhaps best seen in FIG. 2, the gauge-wheel hydraulic cylinder 50A connects with gauge wheel 42A through a linkage 52 such that cylinder 50A provides a downward pressure or precharge on the gauge wheel 42A. The hydraulic cylinders 50A and 50B may be of conventional design well understood by those skilled in the art and need not be described in greater detail herein.

FIG. 3 illustrates a hydraulic circuit 60 associated with the gauge-wheel pressure system 44. The hydraulic circuit 60 includes a hydraulic supply 70 in a primary side 72 of the hydraulic circuit 60. The hydraulic supply 70 is provided by the towing vehicle (not shown). The gauge-wheel pressure system 44 includes a pressure-reducing valve 80 designated to act as a pressure-regulating device for a secondary side 82 of the hydraulic circuit 60. In one embodiment, the pressure-reducing valve 80 is a pilot-operated, sliding spool, screw-in cartridge style, hydraulic pressure-reducing valve. In the illustrated embodiment, a pressure gauge 84 reads the pressure in the secondary side 82 of the circuit 60 and is used so that an operator may use the pressure-reducing valve 80 to manually set the pressure in the secondary side 82. FIG. 4 illustrates an alternate embodiment of the hydraulic circuit 60 in which the pressure gauge 84 includes a suitable transducer and the pressure-reducing valve 80 is electronically controlled such that the pressure in the secondary side 82 is selectively controlled from the cab of the towing vehicle during operations based on the conditions encountered by the implement 10. In one embodiment, the hydraulic circuit 60 contains a pilot-operated check valve 90 to isolate the pressure-reducing valve 80 and hydraulic circuit 60 from the hydraulic supply 70. Alternately, a valve in the towing vehicle's hydraulic system may be used to isolate the gauge-wheel pressure system 44.

The secondary side 82 of the hydraulic circuit 60 is configured such that hydraulic cylinders 50A and 50B are arranged in series such that hydraulic cylinder 50B is a slave cylinder to the master cylinder 50A. In one embodiment, a first hydraulic line 92 runs between the pressure-reducing valve 80 and a piston side 96 of the master cylinder 50A. A second line 94 runs between a rod side 98 of the master cylinder 50A and the piston side 100 of the slave cylinder 50B. A third line 102 runs between the rod side 104 of the slave cylinder 50B and the check valve 90. However, one skilled in the art will understand that the hydraulic cylinders 50A and 50B may alternately be configured in a parallel arrangement.

Controlling the precharge in the secondary side 82 of the hydraulic circuit 60 enables the operator of the implement 10 to adjust the down pressure provided by the hydraulic cylinders 50A and 50B based on desired stiffness of the implement 10 and differing field conditions. With the use of the pressure-reducing valve 80 to produce a constant adjustable desired pressure, an operator is able to command flow from the towing vehicle through the pressure-reducing valve 80 once the implement 10 is at its working depth as set by the depth-control system 32 and put down-pressure on the gauge wheels 42A, 42B. Once this desired down-pressure has been achieved, flow from the hydraulic supply 70 from the towing vehicle can be shut off and the check or blocking valve 90 will then hold the pressure such that the cylinders 50A, 50B hold the gauge wheels 42A, 42B in the desired position.

The foregoing has broadly outlined some of the more pertinent aspects and features of the present disclosure. These should be construed to be merely illustrative of some of the more prominent features and applications of the disclosure. Other beneficial results can be obtained by applying the disclosed information in a different manner or by modifying the disclosed embodiments. Accordingly, other aspects and a more comprehensive understanding may be obtained by referring to the detailed description of the exemplary embodiments taken in conjunction with the accompanying drawings.

The invention claimed is:

1. A tillage implement, comprising:
a frame having a center section and first and second outer wing sections hingedly attached to outer ends of the center section such that the first and second wing sections can be operably raised and lowered between a field-working position and a transport position, wherein the center section and the first and second outer wing sections carry tillage tools for working the soil as the tillage implement is advanced across a field;
a first vertically adjustable stabilizer-wheel assembly connected to an outer front portion of the first outer wing section, the stabilizer-wheel assembly including a first gauge wheel;
a second vertically adjustable stabilizer-wheel assembly connected to an outer front portion of the second outer wing section, the stabilizer-wheel assembly including a second gauge wheel;
a gauge-wheel pressure system configured to act upon the first and second stabilizer-wheel assemblies, wherein the gauge-wheel pressure system includes a first hydraulic cylinder connected to the first gauge wheel and a second hydraulic cylinder connected to the second gauge wheel, each hydraulic cylinder connecting with its respective gauge wheel through a linkage such that each hydraulic cylinder provides a downward pressure precharge on its respective gauge wheel; and
a hydraulic circuit associated with the gauge-wheel pressure system, the hydraulic circuit including:
a hydraulic supply in a primary side of the hydraulic circuit, wherein the gauge-wheel pressure system includes a pressure-reducing valve configured to regulate a pressure in a secondary side of the hydraulic circuit;
a check valve configured to isolate the pressure-reducing valve and hydraulic circuit from the hydraulic supply; and
a pressure gauge configured to measure the pressure in the secondary side of the circuit and convey the measured pressure to an operator of the tillage implement;
wherein controlling the pressure in the secondary side of the hydraulic circuit enables the operator to adjust the downward pressure precharge provided by the first and second hydraulic cylinders based on a desired stiffness of the implement, and wherein the pressure-reducing valve is configured such that flow from the hydraulic supply through the pressure-reducing valve applies the downward pressure precharge on the gauge wheels, and once the downward pressure precharge has been achieved, flow from the hydraulic supply can be terminated while the check valve holds the pressure such that the first and second hydraulic cylinders hold their respective gauge wheels in a preselected position.

2. The tillage implement of claim 1, further comprising frame-supporting wheels, the frame-supporting wheels being mounted to wheel-mounting spars which are rigidly attached to a rock shaft, wherein the rock shaft is mounted to the frame for rotational movement relative to the frame controlled by a depth-control system, and wherein the depth-control system includes an actuator configured to rotate the rock shaft and move the frame relative to the frame-supporting wheels upwardly or downwardly to raise or lower a working depth of the tillage tools.

3. The tillage implement of claim 2, wherein the pressure-reducing valve is configured such that flow from the hydraulic supply through the pressure-reducing valve can be terminated once the tillage tools are at the working depth set by the depth-control system, and wherein the check valve keeps the downward pressure precharge on the gauge wheels, such that the first and second cylinders hold their respective gauge wheels in the desired position.

4. The tillage implement of claim 3, wherein the pressure-reducing valve, comprises a pilot-operated, sliding spool, screw-in cartridge style, hydraulic pressure-reducing valve.

5. The tillage implement of claim 1, wherein the hydraulic cylinders are arranged in series such that the second hydraulic cylinder is a slave cylinder to a master cylinder, wherein the master cylinder is the first hydraulic cylinder.

6. The tillage implement of claim 1, wherein the pressure gauge comprises a transducer and wherein the pressure-reducing valve is electronically controlled such that the pressure in the secondary side is selectively controllable from a cab of a vehicle towing the tillage implement during operations based on conditions encountered by the tillage implement.

7. The tillage implement of claim 1, wherein the hydraulic circuit contains a pilot-operated check valve configured to isolate the pressure-reducing valve and the hydraulic circuit from the hydraulic supply.

8. The tillage implement of claim 1, wherein the hydraulic supply is provided by a towing vehicle.

9. A system comprising a vehicle towing the tillage implement of claim 8, wherein a valve in a hydraulic system of the vehicle is operable to isolate the gauge-wheel pressure system.

10. A tillage implement, comprising:
a frame;
a gang assembly carrying a plurality of tillage tools, the gang assembly including a rotating shaft supported on a support bar, wherein the support bar is mounted to a rock shaft, the rock shaft supported for rotational movement relative to the frame;
a first stabilizer-wheel assembly connected to a first outer front portion of the frame, the stabilizer-wheel assembly including a first gauge wheel connected to the frame by a first linkage;
a second stabilizer-wheel assembly connected to a second outer front portion of the frame, the stabilizer-wheel assembly including a second gauge wheel connected to the frame by a second linkage;
a gauge-wheel pressure system configured to act upon the first and second stabilizer-wheel assemblies, the gauge-wheel pressure system comprising a first hydraulic cylinder configured to move the first linkage relative to the frame and a second hydraulic cylinder configured to move the second linkage relative to the frame; and
a hydraulic circuit associated with the gauge-wheel pressure system, the hydraulic circuit comprising a primary side and a secondary side, the hydraulic circuit including:
a hydraulic supply in the primary side;

a pressure-reducing valve configured to regulate a pressure in the secondary side of the hydraulic circuit;

a check valve configured to isolate the pressure-reducing valve and the secondary side from the hydraulic supply; and a pressure gauge configured to measure the pressure in the secondary side and convey the measured pressure to an operator of the tillage implement;

wherein the pressure-reducing valve is configured such that flow from the hydraulic supply through the pressure-reducing valve applies the downward pressure precharge on the first and second gauge wheels, and wherein when flow from the hydraulic supply is shut off, the check valve holds the pressure in the secondary side such that the first and second hydraulic cylinders hold the first and second gauge wheels in preselected positions relative to the frame.

11. The tillage implement of claim 10, wherein the frame comprises a plurality of sections hingedly connected such that at least one of the sections can be operably raised to a transport position and lowered to a field-working position.

12. The tillage implement of claim 11, wherein the first stabilizer-wheel assembly is connected to a first section of the frame, and wherein the second stabilizer-wheel assembly is connected to a second section of the frame.

13. The tillage implement of claim 10, further comprising a plurality of frame-supporting wheels mounted to wheel-mounting spars rigidly attached to the rock shaft.

14. The tillage implement of claim 13, wherein the rock shaft is configured to rotate relative to the frame responsive to a depth-control system, wherein the depth-control system comprises an actuator configured to rotate the rock shaft and move the frame upwardly or downwardly relative the frame-supporting wheels to raise or lower a working depth of the tillage tools.

15. The tillage implement of claim 14, wherein the pressure-reducing valve is configured to maintain the downward pressure precharge on the first and second cylinders after flow from the hydraulic supply through the pressure-reducing valve is terminated.

16. The tillage implement of claim 10, wherein the pressure-reducing valve comprises a pilot-operated sliding spool hydraulic pressure-reducing valve.

17. The tillage implement of claim 10, wherein the pressure-reducing valve comprises an electronically controlled pressure-reducing valve.

18. The tillage implement of claim 10, wherein the hydraulic cylinders are arranged in series such that the first hydraulic cylinder is a master cylinder and the second hydraulic cylinder is a slave cylinder to the master cylinder.

19. The tillage implement of claim 10, wherein the pressure gauge comprises a transducer configured to transmit a signal to a vehicle towing the tillage implement.

20. The tillage implement of claim 10, wherein the pressure-reducing valve is configured to be electronically controlled by a vehicle towing the tillage implement.

* * * * *